United States Patent
Radke et al.

(10) Patent No.: US 10,312,071 B2
(45) Date of Patent: Jun. 4, 2019

(54) DYNAMIC RANGE IMPROVEMENT FOR ISOTOPE RATIO MASS SPECTROMETRY

(71) Applicant: Thermo Fisher Scientific (Bremen) GmbH, Bremen (DE)

(72) Inventors: Jens Radke, Bremen (DE); Andreas Hilkert, Delmenhorst (DE); Anne Trinquier, Zurich (CH); Johannes Schwieters, Ganderkesee (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 15/227,196

(22) Filed: Aug. 3, 2016

(65) Prior Publication Data

US 2017/0047217 A1    Feb. 16, 2017

(30) Foreign Application Priority Data

Aug. 14, 2015    (GB) .................................. 1514481.9

(51) Int. Cl.
*B01D 59/44*    (2006.01)
*H01J 49/00*    (2006.01)
(Continued)

(52) U.S. Cl.
CPC .......... *H01J 49/30* (2013.01); *H01J 49/0027* (2013.01); *H01J 49/025* (2013.01); *B01D 59/44* (2013.01)

(58) Field of Classification Search
CPC ...... H01J 49/30; H01J 49/0027; H01J 49/025; B01D 59/44
(Continued)

(56) References Cited

U.S. PATENT DOCUMENTS 5,043,575 A    8/1991 Habfast et al.
5,180,913 A    1/1993 Laue
(Continued)

FOREIGN PATENT DOCUMENTS

CN    102280345 A    12/2011
CN    103824750 A    5/2014
(Continued)

OTHER PUBLICATIONS

Bernasconi et al., "Background effects on Faraday collectors in gas-source mass spectrometry and implications for clumped isotope measurements," Rapid Commun. Mass Spectrom., 27, 603-612, 2013.

(Continued)

*Primary Examiner* — Nicole M Ippolito
*Assistant Examiner* — Hanway Chang
(74) *Attorney, Agent, or Firm* — Nicholas Caims; A. J. Gokcek

(57) ABSTRACT

In a mass spectrometer, a mass-to-charge dispersive element separates received ions spatially according to their mass-to-charge ratios, to provide a dispersed ion beam thereby. An ion detection arrangement that detects the dispersed ion beam comprises: at least one primary ion detector, each detecting spatially separated ions having mass-to-charge ratios within a respective desired range and each providing a respective main beam signal based on its respective detected ions; and at least one secondary ion detector, each detecting ions having mass-to-charge ratios outside all of the desired ranges simultaneously with the at least one primary ion detector detecting the spatially separated ions and each providing a respective background signal based on its respective detected ions. At least one mass intensity measurement is provided for the received ions having a mass-to-charge ratio within the desired range, based on the at least one main beam signal and the at least one background signal.

20 Claims, 5 Drawing Sheets

(51) Int. Cl.
*H01J 49/02* (2006.01)
*H01J 49/30* (2006.01)

(58) Field of Classification Search
USPC ............... 250/281, 282, 288, 294, 299, 300
See application file for complete search history.

(56) References Cited

U.S. PATENT DOCUMENTS

| | | |
|---|---|---|
| 6,449,584 B1 | 9/2002 | Bertrand et al. |
| 2013/0119249 A1* | 5/2013 | Niehuis ............... H01J 49/0031 250/282 |

FOREIGN PATENT DOCUMENTS

| | | |
|---|---|---|
| EP | 0952607 B1 | 9/2008 |
| GB | 2499868 A | 9/2013 |
| GB | 2526857 A | 12/2015 |
| WO | 2008/139193 A2 | 11/2008 |

OTHER PUBLICATIONS

Meckler et al., "Long-term performance of the Kiel carbonate device with a new correction scheme for clumped isotope measurements," Rapid Commun. Mass Spectrom., 28, 1705-1715, 2014.

* cited by examiner

US 10,312,071 B2

1

DYNAMIC RANGE IMPROVEMENT FOR ISOTOPE RATIO MASS SPECTROMETRY

CROSS-REFERENCE TO RELATED APPLICATION

This application claims the priority benefit under 35 U.S.C. § 119 to British Patent Application No. 1514481.9, filed on Aug. 14, 2015, the disclosure of which is incorporated herein by reference.

TECHNICAL FIELD OF THE INVENTION

The invention relates to a mass spectrometer, a controller for a mass spectrometer and method of mass spectrometry, particularly in the field of isotope ratio mass spectrometry.

BACKGROUND TO THE INVENTION

Multi-collector mass spectrometers are well-known, particularly for distinguishing between isotopes. A mass-to-charge dispersive element, such as a magnetic sector, separates ions spatially according to their mass-to-charge ratios. Multi-collector measurements are the preferred method for high precision isotope ratio measurement, because the parallel detection of the isotopes or isotopologues may eliminate the effect of signal fluctuations on the precision of the measured isotope ratio. The detector array may be fixed or movable. An example of such a mass spectrometer is described in EP-0 952 607 A2.

The parallel measurement means that signal fluctuations are recorded on all isotopes or isotopologues at the same time. Thus, these signal fluctuations cancel for the isotope ratio calculation of two parallel measured signals. For large dynamic range isotope ratio measurements, this can present a particular challenge. The scattered background of the major ion beam (or beams) can disturb the baseline of the minor isotopes or isotopologues. This can be caused by scattering of the major ion beam, especially on apertures, slits, flight tubes in the magnetic field and along the optical flight path, residual gas molecules and on the detector modules. The scattered background typically is in the range of several parts-per-million (ppm) up to hundreds of ppm, depending on the relative mass distance of the major ion beams. This can make it difficult to perform high precision measurements (with a precision and accuracy in the range of 1% or smaller) of isotope ratios or isotope abundances with a dynamic range of 1:100 or greater.

In fact, existing instruments have been designed to measure isotope ratios with a maximum dynamic range of approximately $10^4$. However, it is desirable to measure additional peaks at positions where two or more minor isotopes of one element are present in a molecule and thus create a very rare species, with abundances in the parts per million (ppm) range. In the case of carbon, oxygen and hydrogen, the heavier isotopes are the less abundant isotopes. If the molecule is formed at low temperatures, then there is a statistical preference to form molecules comprising of heavier isotopes. This effect is called clumping of isotopes in molecules. As these isotopes and particularly isotopologues are much less intense than others, a dynamic range between the collectors in the range of $10^6$ to $10^8$ is more preferable.

A particular example of clumped isotopes is in carbon dioxide testing with the measurement of the very rare 13C18O16O isotopologue alongside the major 12C16O16O isotopologue, which causes scattered background. The abundance of the 13C18O16O isotopologue is only in the range of a few ppm. The enrichment of this isotopologue can be used as an independent tracer for the formation temperature of this molecule. Hence, the precise and accurate abundance measurement of this isotopologue can be of fundamental interest for many fields of science, such as atmospheric sciences or applications in biogeochemistry. One way to eliminate the scattered background is to use an energy filter in front of the 13C18O16O detector to discriminate the scattered background, due to the small energy loss that the scattered ions have experienced by the scattering event. Examples of this are discussed in U.S. Pat. Nos. 5,180,913 and 5,043,575.

Another example where isotope ratios are measured over a large dynamic range is the measurement of uranium (U) isotopes. The accurate and precise measurement of the minor U isotopes is also challenging in view of their very low abundance. For instance, the isotope 236U only occurs naturally in very minor traces and a small enrichment of this tracer can therefore be regarded as an indicator as to whether the U material has been processed in a nuclear reactor. Consequently, the precise and accurate measurement of the 236U isotope can be important for nuclear forensics as well as for balancing of nuclear material through international control agencies. Isotopic ratio measurement of U may therefore demand a mass spectrometer with a high dynamic range.

Measurement of the minor U isotopes is made difficult by scattered background resulting from the major 238U isotopes. A known solution to this problem, which allows precise measurement of the minor U isotopes 234U and 236U, is to use a single or dual Retarding Potential Quadrupole (RPQ) setup. Here, the scattered background of the major 238U isotopes is discriminated by an energy filter, positioned in front of (upstream) the detector. Referring to FIG. 1, there is shown a diagram of an existing multiple collection detector configuration for the measurement of U isotopes. This comprises Compact Discrete Dynode (CDD) detectors, Faraday cups and Secondary Electron Multiplier (SEM) detectors. An arrangement is shown for detection of 233U, 234U, 235U, 236U and 238U isotopes, with an RPQ filter upstream the SEM detectors for the low abundance 234U and 236U isotopes. This procedure works, but requires a rather complex detector setup. Moreover, detection of U isotopes can present other issues, such as: ionization efficiency (sensitivity); fractionation corrections; detector uncertainties (noise, calibrations); peak tailing corrections; possible interferences (e.g. K-clusters); blank corrections; and availability of certified reference materials.

Referring to FIG. 2, there is shown an example mass spectrum from mass 233 to 238 for a sample measured on an existing thermal ionization mass spectrometer. The peak corresponding with 236U can be seen, with much lower abundance comprises with the 234U and 235U peaks. The problem of potassium (K) cluster interferences, specifically 39K, is shown. In the main spectrum shown, an RPQ setup has been used. In the corner, there is also shown a portion of the mass spectrum without the use of RPQ. The 236U peak is no longer distinct.

A further approach to overcome the background problem is to measure the background intensity slightly beside the peak, as discussed in "Long-term performance of the Kiel carbonate device with a new correction scheme for clumped isotope measurements", A. Nele Meckler, Martin Ziegler, M. Isabel Milian, Sebastian F. M. Breitenbach and Stefano M. Bernasconi, Rapid Commun. Mass Spectrom. 2014, 28, 1705-1715. This can be achieved by setting the magnet of the sector to a slightly higher or lower mass, such that the detector does not catch the isotopologue, but instead measures the background beside the peaks. From this off-peak measurement, the background signal for the on-peak measurements can be deduced. Such a procedure can allow control of the background, but requires sequential background measurements during the sample measurement, which adds to the measurement time and to the uncertainty of the background measurement.

Moreover, it unnecessarily consumes sample material, which is very often limited. It has been found that the actual baseline may depend on the ion beam intensity and as such, the baseline would need to be measured and calibrated for different ion beam intensities. This is a very tedious procedure which limits the attainable precision and also further extends measurement time and reduces sample utilization. In reality, the user may not readily find the accurate baseline position, which is representative for the background measurement during the on-peak isotope ratio analysis. Finding the right baseline position can require extensive and elaborate calibration measurements and may be very time-consuming. Also, the baseline structure may change over time and also from instrument to instrument and can be hard to control.

Another way to eliminate or reduce the scattered background intensity is to shield the major ion beam in a type of split flight tube. This principle is implemented in a noble gas mass spectrometer manufactured by Thermo Fisher Scientific™ under the label Helix SFT™. This instrument is designed for the precise and accurate measurement of the 4He and 3He isotope abundances and uses a split flight tube starting at the exit of the magnet. The 4He and 3He ion beams are guided into separate flight tubes, such that the scattered background due to the major 4He ion beam is stopped in the 4He flight tube and does not cause significant interference to detection of the relatively very minor 3He beam. Like the energy filter setup, the split flight tube approach also requires rather complicated and complex detector configurations, which dramatically reduce the flexibility of the detector setup.

In view of the above, an improved approach for the accurate and precise measurement of isotope ratios with a high dynamic range is still being sought. Existing technologies are complex and therefore expensive to implement and may suffer from other disadvantages, such as reduced throughput and/or require higher sample quantity. The known approaches may also limit or restrict the flexibility of the instrument and the detector array for other applications.

SUMMARY OF THE INVENTION

Against this background, there is provided a mass spectrometer in line with claim 1, a method of mass spectrometry in accordance with claim 18, a controller defined by claim 22 and a computer program in line with claim 23. The controller may be in the form of a computer program, hardware, software, firmware or combination thereof. Other preferred features are disclosed with reference to the claims and in the description below.

Effectively, the approach proposed use one or more additional detectors to measure the background on-line during the analysis. A background intensity measurement can therefore be made at the same time as the main beam is being detected (so-called online measurement), for example by measuring off-peak such as between peaks or in another place along the focal plane where there is no other isotopologue hitting the detector plane. Subtracting the background intensity measurement (preferably scaled by a factor) from the main beam intensity measurements can allow the background scattering interference to be cancelled in an effective way. This approach may especially be applied to an instrument using a magnetic and/or electric sector. The detectors may be Faraday cups in the form of a collector array. The use of an off-peak position detector may allow for online control of metastable production, as well as for interference control.

Unlike existing solutions, this approach can be implemented in a straightforward way, it retains flexibility and speed of the instrument (measuring time is not affected, unlike off-peak background measurement) and it does not consume more sample than without the additional detectors. In particular, it allows precise scattered background control to be managed by standard Faraday collectors or other standard detectors (such as CDD an ion counting channel using a secondary electron multiplier or a photomultiplier as the amplification device), rather than very specific and bulky detector configurations (such as the use of energy filters or split flight tubes) that can also limit the flexibility of the detector array to allow for high precision isotope ratio measurements of other elements on the same instrument. No energy filtering between the sector exit and the detectors may be needed. Also, the background measurement is made at the same time as the major ion beams are captured in the detectors. As a result, there is no loss of throughput. Moreover, there is a significant further benefit in comparison with sequential detection of background and main beam.

When the background is measured alone, by tuning the magnet to an off-peak mass position (as known in existing approaches), the major abundance ion beams are not captured in the detectors but will rather hit surfaces close along the detector plane. This can cause additional scattered background other than in the on peak position, which will result in an instable baseline measurement. Thus, the accuracy of the proposed approach may be significantly better than the known alternative. Another complication with known off-peak baseline control is that the baseline is measured in a condition which is not the measurement condition for the main beam. In other words, the ion beams are captured inside the detectors during the main beam measurement condition, while most of the ion beams are not captured inside the detector during the off-peak baseline measurement. As such, these beams may cause additional scattered background, which is different from the background during the real on-peak measurement when most ion beams are captured inside the detector. The approach disclosed herein may help to resolve this issue.

Where the background intensity measurement is scaled by a factor before subtraction from the main beam intensity measurements, the factor may be a constant and/or determined by calibration. Such calibration may be much more straightforward and predictable than the procedures for calibrating sequential background measurement.

In some embodiments, one or more protection plates can be arranged to shield the main beam detectors from scattered background ions. This shielding plate may be relatively small, especially in comparison with a split flight tube and may reduce the overall scattered background significantly.

BRIEF DESCRIPTION OF THE DRAWINGS

The invention may be put into practice in various ways, one of which will now be described by way of example only and with reference to the accompanying drawings in which.

DETAILED DESCRIPTION OF A PREFERRED EMBODIMENT

Figure 2:
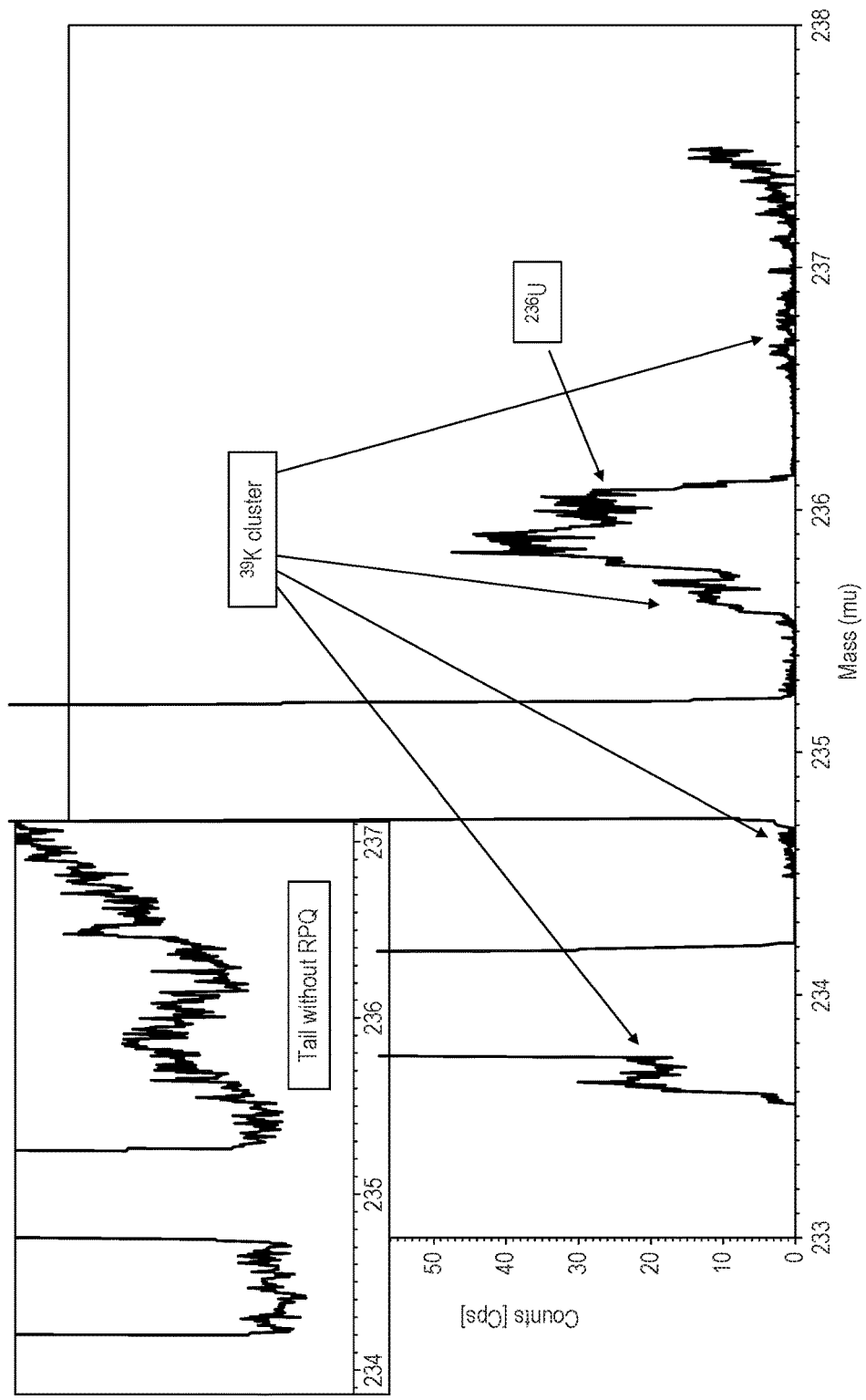
FIG. 2 shows an example mass spectrum from mass 233 to 238 for a sample measured on an existing thermal ionization mass spectrometer.

As noted above, it is proposed to use an additional detector or several additional detectors to measure the background during the analysis. Referring first to FIG. 2, there is shown a schematic illustration of a mass spectrometer 1. The mass spectrometer 1 comprises: an ion source 10; ion optics 20; a mass-to-charge dispersive element 30; an ion detection arrangement 40; and a processor 50. The ion optics 20 may comprise one or more optics selected from: an ion lens, an ion guide and a collision cell. The mass-to-charge dispersive element 30 is a magnetic sector in this embodiment. The ion detection arrangement 40 is in the form of a collector array and comprises: a first main beam detector 41; a second main beam detector 42; a background level detector 43; and a shielding plate 45. The first 41 and second 42 main beam detectors and the background level detector 43 are positioned at the focal plane 35 of the magnetic sector 30.

The ion source 10 generates an ion beam 15, which is spatially separated by the magnetic sector 30. As shown in FIG. 2, the main beam 15 is separated into two main beams: a first main beam 31; and a second main beam 32, which may correspond with first and second isotopes of an element or isotopologues of a molecule, or even different elements or different molecules. The magnetic sector is tuned and/or the first 41 and second 42 main beam detectors are positioned such that the first and second main beams are detected by the first and second main beam detectors respectively. At the same time as this occurs, the background level detector 43 detects background scattered ions. The background level detector 43 is positioned away from the main beams, specifically between the main beams as shown in the FIG. 2.

The shielding plate 45 extends to between the first main beam detector 41 and the background level detector 43. In general, the shielding plate 45 advantageously extends across the focal plane of the mass-to-charge dispersive element 30. The shielding plate 45 is coated with carbon (typically graphite) or tantalum. The coating is designed to have low secondary electron and secondary ion yields and these materials are especially suitable for that purpose. The shielding plate 45 is a thin sheet of metal, around 0.5 mm thick. A typical Faraday cup collector is 3 to 5 mm wide with an opening of around 0.8 to 1.7 mm in size. The shielding plate 45 is much thinner than the distance between two collectors.

The shielding plate 45 can reduce or even minimize the overall scattered background. It acts as a protection plate inside the collector array which shields the major ion beam in the detector area. It can prevent "stray" ions from entering detectors. This idea is advantageous compared to the split flight tube setup, discussed above, in which separate flight tubes for the major and minor isotopes respectively may avoid the interference of the scattered ions with the minor isotope ion path. The split flight tube may limit the use of the mass spectrometer to a very specific use. However, a small shielding plate installed into the collector array instead may effectively reduce the scattered background on the minor isotope detectors because of the shielding effect without limiting the mass spectrometer to a very specific use. Another advantage of the shielding plate 45 is that it may prevent "stray" ions from hitting other relevant components like the (typically exposed) wiring of the detection system.

The outputs of the first main beam detector 41 (a first main beam signal), the second main beam detector 42 (a second main beam signal) and the background level detector 43 (a background signal) are provided to the processor 50. The processor 50 uses these signals to determine an intensity level for the first 31 and second 32 main beams and consequently an isotopic ratio for the ion beam 15, where the first and second main beam signals arise from detection of first and second isotopes of an element or isotopologues of a molecule. Additionally or alternatively, the processor 50 may use these signals to determine an elemental ratio or molecular ratio for the ion beam 15, where the first and second main beam signals arise from detection of different elements or molecules. Specific ways in which these signals can be used will be discussed below. The processor 50 may be part of a general purpose computer (having a normal user interface, such as a display, storage and/or one or more input peripherals) or it may be an application-specific processor. Software and/or firmware may be used to configure the processor 50 accordingly.

In a general sense, this may be understood as a mass spectrometer (particularly an isotope ratio mass spectrometer or a mass spectrometer for isotopic ratio analysis), comprising: a mass-to-charge dispersive element, configured to receive ions and separate the ions spatially according to their mass-to-charge ratios, to provide a dispersed ion beam thereby; an ion detection arrangement for detecting the dispersed ion beam, comprising: at least one primary ion detector, each arranged (positioned, when a collector is used for instance) to detect spatially separated ions having mass-to-charge ratios within a respective desired range and each configured to provide a respective main beam signal based on its respective detected ions; and at least one secondary ion detector, each arranged (positioned, when a collector is used for instance) to detect ions having mass-to-charge ratios outside all of the desired ranges simultaneously with the at least one primary ion detector detecting the spatially separated ions and each configured to provide a respective background signal based on its respective detected ions; and a processor, configured to provide at least one mass intensity measurement for the received ions having a mass-to-charge ratio within the desired range, based on the at least one main beam signal and the at least one background signal.

In another general sense, this may be considered a method of (isotope ratio) mass spectrometry, comprising: spatially separating received ions according to their mass-to-charge ratios using a mass-to-charge dispersive element, to provide a dispersed ion beam thereby; detecting, at each of at least one primary ion detector, spatially separated ions having mass-to-charge ratios within a respective desired range and providing a respective main beam signal based on the respective detected ions; detecting, at each of at least one secondary ion detector, ions having mass-to-charge ratios outside all of the desired ranges, simultaneously with the at least one primary ion detector and providing a respective background signal based on the respective detected ions; providing at least one mass intensity measurement for the received ions having a mass-to-charge ratio within the desired range, based on the at least one main beam signal and the at least one background signal. This method may optionally comprise process steps corresponding with the functionality of any of the structural features described herein with reference to the mass spectrometer. Such a method may be implemented by a controller, configured to operate a mass spectrometer accordingly and may be implemented in hardware, firmware, software or a combination thereof.

Preferably, the at least one primary ion detector comprises plurality of primary ion detectors, each arranged to detect spatially separated ions having mass-to-charge ratios within a respective desired range. This may be especially useful for isotope ratio mass analysis. The plurality of primary ion detectors are optionally configured to measure ion intensities having a dynamic range of at least 1:100, $1:10^4$, $1:10^6$ or $1:10^8$. In the preferred embodiment, each of the desired ranges corresponds with a range of mass-to-charge ratios for an isotope of an element (a single element) or an isotopologue (a single isotopologue) of a molecule and wherein the at least one secondary ion detector comprises (or optionally consists of) a secondary ion detector arranged to detect spatially separated ions having mass-to-charge ratios that do not correspond with a range of mass-to-charge ratios for an isotope of the (single) element or an isotopologue of the (single) molecule. The (single) element may comprise uranium, helium, thorium or other radioactive elements. The single molecule may comprise carbon dioxide. These species may share common features in that very intense and very low abundant isotopes (or isotopologues) exist and will require measurement at the same time.

The at least one primary ion detector may detect (or be configured to detect) a relatively high ion intensity relative to the ion intensity detected by the at least one secondary ion detector. Conversely, the at least one secondary ion detector may detect (or be configured to detect) a relatively low ion intensity relative to the ion intensity detected by the at least one primary ion detector or each primary ion detector. As the at least one secondary ion detector is configured to measure the background noise, which is typically broadband in nature, each secondary ion detector may be positioned or otherwise arranged to measure off-peak, whereas each primary ion detector may be arranged to measure a peak.

In the preferred embodiment, the mass-to-charge dispersive element and/or the at least one primary ion detector are configured so as to cause the at least one primary ion detector to detect one or more ion intensity peaks in the dispersed ion beam. Preferably, the at least one secondary ion detector may be configured such that each secondary ion detector of the at least one secondary ion detector detects a background ion intensity. The primary ion detector (or detectors) and/or the secondary ion detector (or detectors) may be configured by positioning.

Each detector of the at least one primary ion detector is advantageously positioned on a focal plane defined by the mass-to-charge dispersive element. Optionally, each detector of the at least one secondary ion detector is also positioned on the focal plane. In embodiments, each of the at least one primary ion detector and/or each of the at least one secondary ion detector comprises one or more of: a Faraday cup; a Compact Discrete Dynode (CDD) detector; and a Secondary Electron Multiplier (SEM) detector. The mass-to-charge dispersive element comprises (or consists) of one or both of a magnetic sector and an electric sector.

The mass spectrometer is advantageously configured such that ions spatially separated by the mass-to-charge dispersive element are received at each of the at least one primary ion detector without energy filtering in between. Energy filtering, such as use of an RPQ filter, may not be necessary in conjunction with this technique.

In the preferred embodiment, the mass spectrometer further comprises an ion source, configured to generate ions. A thermal ionisation source, electron impact ionisation source or Inductively Coupled Plasma (ICP) ionisation source, for example, may be employed. Optionally, the mass spectrometer further comprises ion optics, configured to provide the generated ions to the mass-to-charge dispersive element. Collision cell technology (CCT) may be used to reduce the effects of peak interferences at the detectors. In this approach, a gas-filled collision cell may be positioned between the ion source and the mass-to-charge dispersive element.

A more specific example will be discussed with reference to the precise and accurate measurement of 236U abundance. A standard Faraday cup is positioned such that it collects the background at one point, specifically at mass position 237, between the peak 236U and 238U. This Faraday cup at mass position 237 measures the background in parallel to the measurement of 236U and 238U ion beams along the focal plane of the mass spectrometer. The corrected intensity for 236U, taking the background into account, is then calculated to be as follows.

$$236U_{true} = 236U_{measured} - c_1 * I(237),$$

where I(237) is the intensity measured on the Faraday cup positioned at mass position 237, between mass 236U and 238U and $c_1$ is a calibration factor (optionally fixed or constant), which can be determined by the measurement of known standards that have passed the same sample preparation.

Another example concerns the measurement of the rare clumped $CO_2$ isotopologues. For this case, a standard Faraday cup is positioned between the isotopologue detector for mass 47 (13O18O16O) and mass 48 (that is, mass position 47.5) and/or between the isotopologue at mass 46 and 47 (that is, mass position 46.5) and/or at any other place along the focal plane where there is no other isotopologue hitting the detector plane. The recorded background signal then is used to correct for the scattered background interfering on peak 47.

In a specific implementation for detection of clumped $CO_2$ isotopologues, the following cup configurations are used for measuring the main isotopologues.

| | Mass | | | | |
|---|---|---|---|---|---|
| | 44 | 45 | 46 | 47 | 48 |
| Species | 12C16O16O | 13C16O16O | 12C16O18O | 13C16O18O | 12C18O18O |
| Abundance | 98.46% | 1.06% | 0.39% | 42.7 ppm | 4 ppm |

The traces at mass positions 47 and 48 are very small compared to the ion beam intensities at mass positions 44, 45 and 46. The minor masses are heavily affected from scattered backgrounds which also depend on the ion beam intensity.

Figure 3:
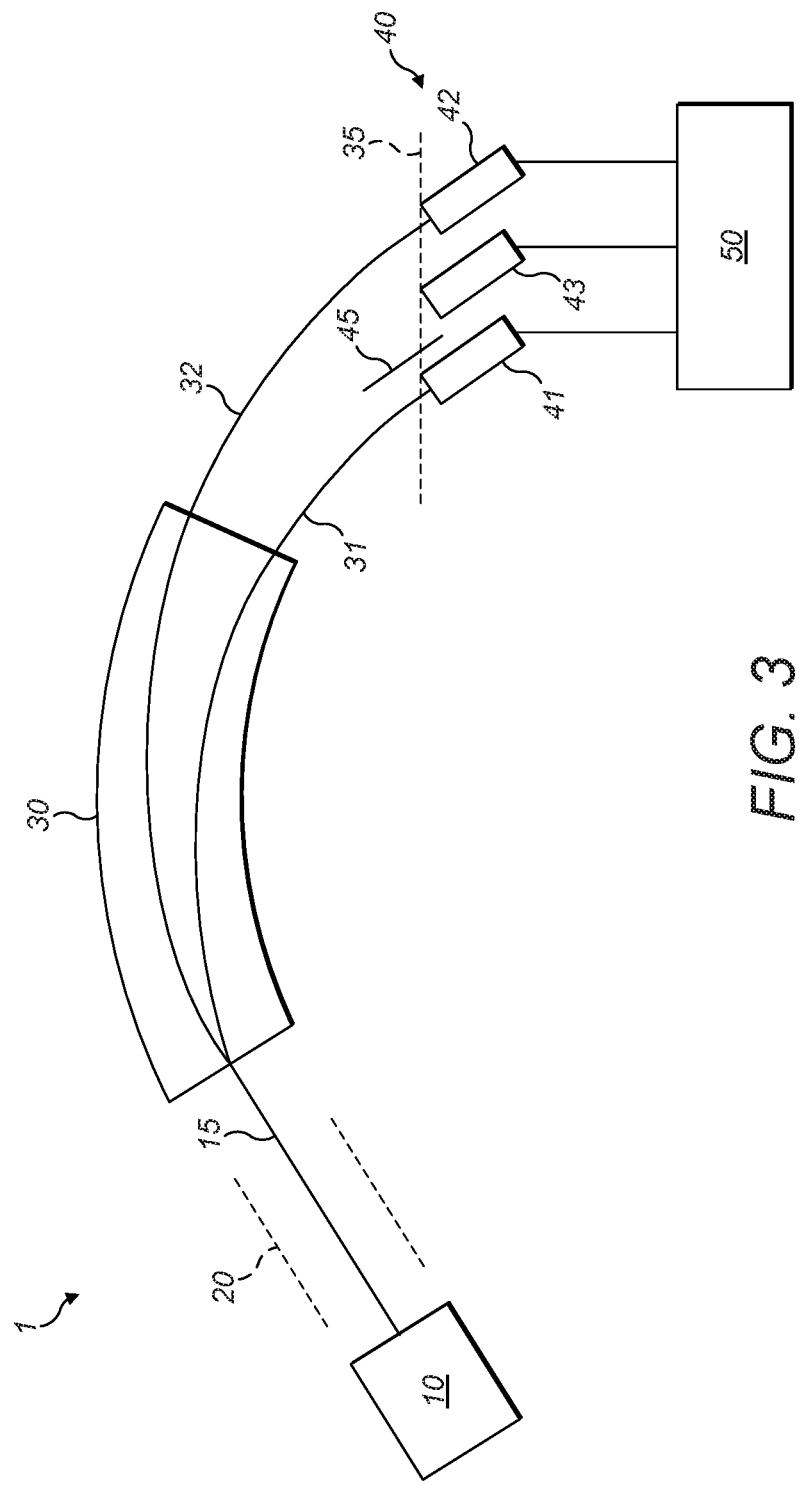
FIG. 3 depicts a schematic illustration of a mass spectrometer in accordance with an embodiment.

More information on this effect can be found in "Background effects on Faraday collectors in gas-source mass spectrometry and implications for clumped isotope measurements", Rapid Commun. Mass Spectrom. 2013 Mar. 15; 27(5):603-12, Bernasconi et al, the details of which are incorporated by reference. In FIG. 3 of this document, one example of how the baseline on the collector cup at mass position 47 depends on the intensity of the major ion beam at mass position 44. The baseline becomes more negative as the mass position 44 intensity increases. Close to the peak where the mass position 44 is no longer captured in the detector, but is striking the detector and causing significant background noise, there are pronounced dips in the background spectrum.

Operators of instruments using off-peak baseline measurement therefore find it difficult to determine a mass position at which to take the baseline measurement. The baseline depends on where the ion beams hit the detector area and it may simply be a matter of good fortune if the operator picked a region where the background signal is reasonably stable. Such an arbitrary selection is not especially useful. Therefore, installing at least one or two additional monitor cups, such as background level detector 43 allow on-line monitoring of the baseline between two ion beams while the ion beams are captured in the detectors. This situation reflects the true measurement configuration and gives a much more accurate and reliable baseline measurement. Then, cup configurations for measuring the main isotopologues and baseline may be used as follows.

| | Mass | | |
|---|---|---|---|
| | 44 | 45 | 46 |
| Species | 12C16O16O | 13C16O16O | 12C16O18O |
| Abundance | 98.46% | 1.06% | 0.39% |

| | Mass | | | |
|---|---|---|---|---|
| | 46.5 | 47 | 47.5 | 48 |
| Species | Baseline | 13C16O18O | Baseline | 12C18O18O |
| Abundance | | 42.7 ppm | | 4 ppm |

In this detector configuration, the baseline detectors at mass positions 46.5 and 47.5 have been placed between detectors at mass positions 46 and 47 and between detectors at mass positions 47 and 48. These detector channels are used to measure the baseline at the same time as the ion species are captured in the detector channels. These signals are recorded in parallel to the measurement of the ion beams of interest at mass positions: 44; 45; 46; 47; and 48.

Shielding has also been provided, in line with the above discussion, around the detectors to reduce the scattered background. This is in line with the shielding discussed above.

Figure 4:
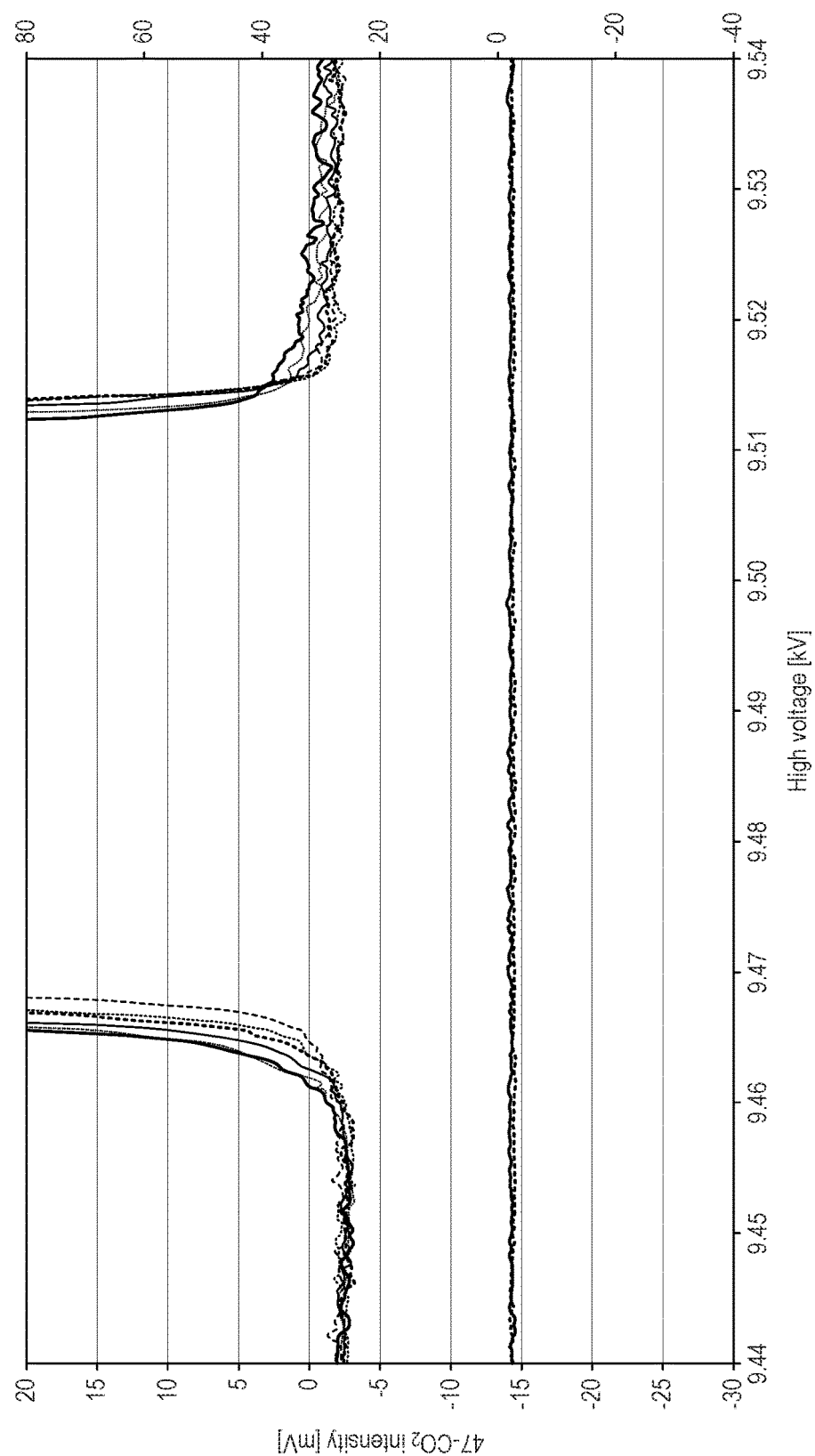
FIG. 4 plots a mass scan around a peak at mass position 47, for different intensities of the mass position 44 ion beam in the measurement of $CO_2$ isotopologues using an instrument in accordance with the embodiment of FIG. 3.

Referring next to FIG. 4, there is shown a mass scan around a peak at mass position 47 (a plot of intensity measured by a detector at mass position 47 against acceleration voltage), for different intensities of the mass position 44 ion beam in the measurement of $CO_2$ isotopologues using this approach. The mass scan is achieved by slightly scanning the acceleration voltage, which is proportional to the mass scale. During this mass scan the ion beams are scanned across the detector array.

This plot shows the peak shapes of the detector at mass position 47, as the ion beams are scanned across the detectors. The major mass position 44 ion beam intensity was varied between 30V down to 5V. Deep dips on the left and right sides of the detectors, which were shown in FIG. 3 of the Bernasconi paper mentioned above, are eliminated. This is due to the improved shielding and also to the fact that the detector for mass position 44 has been chosen to be about twice as wide as the other detectors catching the minor beams. This means that close to the peak, the major ion beam intensity at mass position 44 is still captured inside the extra wide detector and thus does not contribute to scattering.

Figure 5:
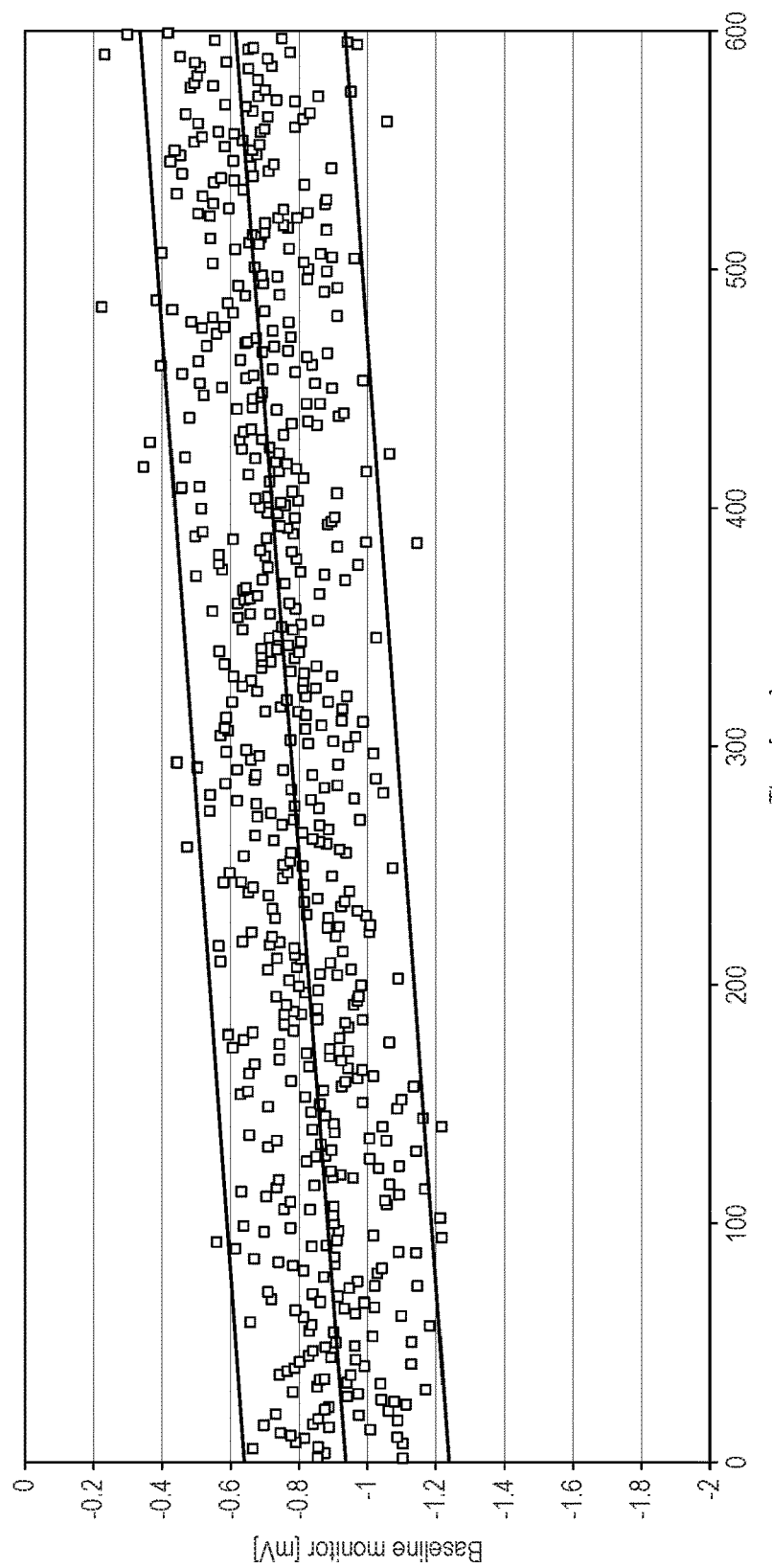
FIG. 5 shows a plot of the signal detected at mass position 47.5 over time, while the major ion beam intensity is changed from 20V down to 9V using the same instrument as with respect to FIG. 4.

Referring next to FIG. 5, there is shown a plot of the signal detected at mass position 47.5 over time, while the major ion beam intensity is changed from 20V down to 9V. This signal reflects the background measurement as the major ion beam intensity is reduced. It can be seen that the baseline signal is generally increasing toward 0V at a low gradient, while the ion beam intensity is decaying from 20V to 9V. The relationship of the signal detected at mass position 47.5 (the baseline signal) to the major ion beam intensity can therefore be approximated as linear. Thus, the following algorithm can be used for baseline correction:

The corrected intensity for mass position 48, taking the background at mass position 47.5 into account, can be calculated as follows.

$$I(48)_{true} = I(48)_{measured} - k_1 * I(47.5)$$

Here, $I(48)_{measured}$ is the intensity of the measured signal intensity at mass 48 (including the measured intensity of the isotopologue 12C18O18O and the scattered background), $I(47.5)$ is the intensity measured on the Faraday cup positioned at mass 47.5 and $k_1$ is a calibration factor (optionally fixed or constant), which can be determined by the measurement of known standards, as discussed above.

The corrected intensity for mass position 47, taking background measurements at mass position 46.5 and at mass position 47.5 into account, may then be calculated as follows.

$$I(47)_{true} = I(47)_{measured} - k_2 * I(46.5) - k_3 * I(47.5)$$

Here, $I(47)_{measured}$ is the intensity of the measured signal intensity at mass 47 (including the measured intensity of the isotopologue 13C18O16O and the scattered background), $I(46.5)$ is the intensity measured on the Faraday cup positioned at mass 46.5, $I(47.5)$ is the intensity measured on the Faraday cup positioned at mass 47.5 and $k_2$ and $k_3$ are calibration factors (optionally fixed or constant), which can be determined by the measurement of known standards, as discussed above.

In fact, experimentation has shown that the measurement of $I(47.5)$ only is sufficient to precisely monitor the baseline signal for both mass 48 and 47. Therefore, the correction with only one baseline cup is sufficiently good. The corrected intensity for mass positions 47 and 48 can be calculated using the following expressions.

$$I(47)_{true} = I(47)_{measured} - q_1 * I(47.5)$$

$$I(48)_{true} = I(48)_{measured} - q_2 * I(47.5)$$

The parameters $q_1$ and $q_2$ can be calibrated by standard measurements. Experimentation has shown that these parameters are reasonably stable. More complex correction formula with higher-order corrections (or an exponential function) can be applied, if necessary, optionally defining a linear and/or nonlinear relationship. However, this has not proved necessary based on current testing and a simple linear correction has turned out to be sufficient.

Figure 1:
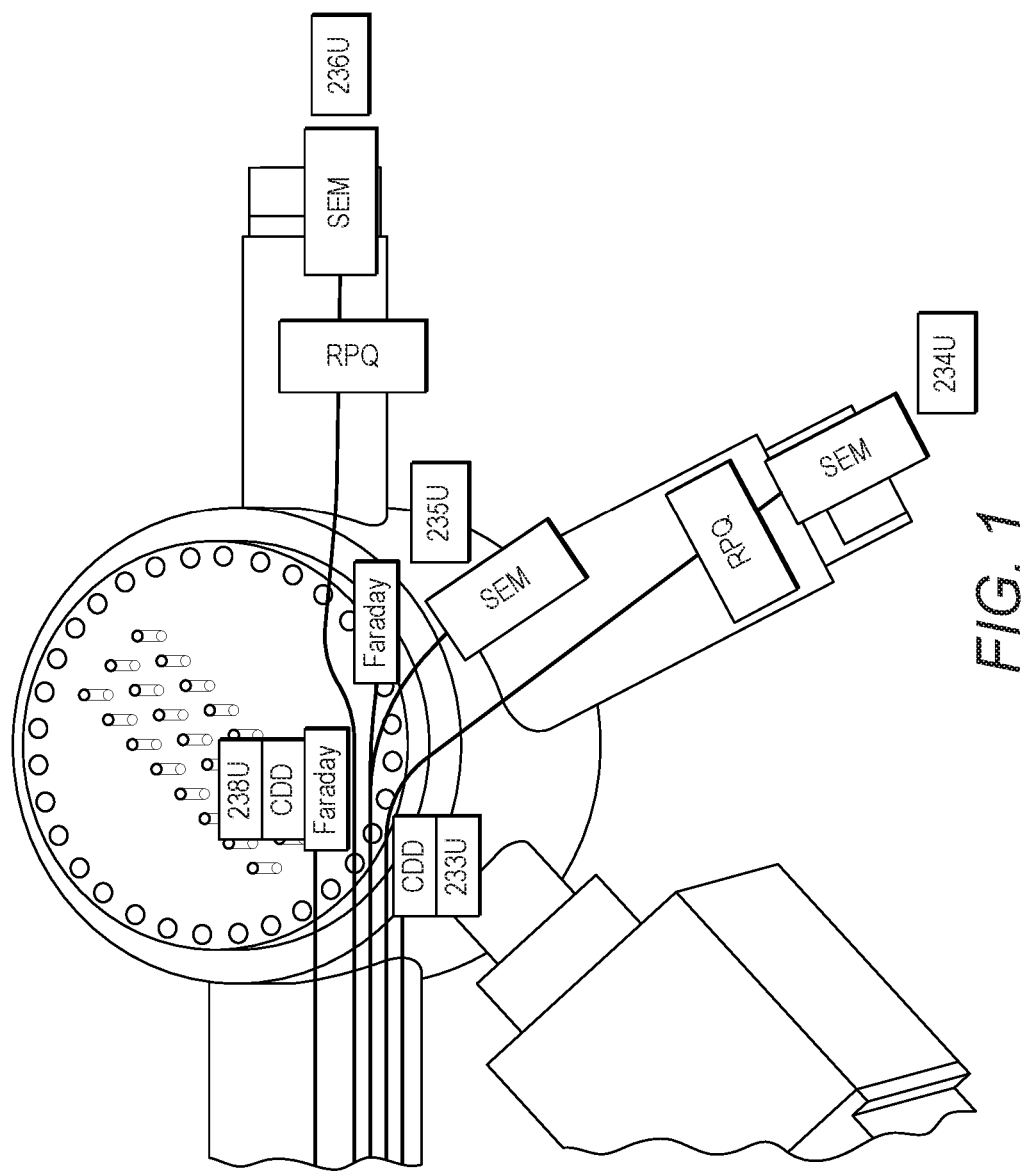
FIG. 1 shows a diagram of an existing multiple collection detector configuration for the measurement of uranium isotopes.

A further example again relates to measurement of U isotopes using static multi-collection mode with constant ion beam intensities in an isotope ratio mass spectrometer in line with those shown in FIGS. 1 and 2. Four loads of 5.5 µg IRMM (Institute for Reference Materials and Measurements) 187 were analyzed and the beam intensity was measured at different mass positions simultaneously. The average beam intensity measurements are below.

| Mass position | Detector type | Average beam intensity |
| --- | --- | --- |
| 234 | Faraday cup - $10^{12}$ Ω amplifier | 160 fA |
| 235 | Faraday cup - $10^{11}$ Ω amplifier | 20 pA |
| 236 | Faraday cup - $10^{13}$ Ω amplifier | 30 fA |
| 237 | Faraday cup - $10^{13}$ Ω amplifier | 2 fA |
| 238 | Faraday cup - $10^{11}$ Ω amplifier | 0.4 nA |

The measurement taken at mass position 237 does not correspond with any isotope of uranium. Rather, this measurement is taken for a background noise reading and it can be seen that this has the lowest average intensity over all of the mass positions measured. Compared to the major 238U ion beam, the measured background at mass position 237 is less than 1 ppm. It can further be seen that, for some of the ion detectors (those with low intensity measurements), an ultra-high impedance amplifier is used, for example as described in co-pending UK patent application no. 1410004.4. This can be used for any of the ion detectors, but is especially advantageous for the measurement of the background noise, which is typically a very low level.

In general terms, embodiments in which the at least one primary ion detector comprises plurality of primary ion detectors may be considered. For example, the at least one primary ion detector may comprise: a first primary ion detector, arranged to detect spatially separated ions having mass-to-charge ratios within a first desired range; and a second primary ion detector, arranged to detect spatially separated ions having mass-to-charge ratios within a second desired range. In certain such embodiments, the at least one secondary ion detector comprises a secondary ion detector arranged to detect ions having mass-to-charge ratios in an intermediate range. Here, the intermediate range is beneficially between the first and second desired ranges. In one of the examples above, the first primary ion detector is arranged to detect 236U, the second primary ion detector is arranged to detect 238U and the secondary ion detector is arranged to detect mass position 237. As in this example, the at least one primary ion detector may comprise one or more further ion detectors, each arranged to detect ions having other mass-to-charge ratios.

In other such embodiments, the plurality of desired ranges (together) define an overall range extending continuously from the lowest mass-to-charge ratio within the desired ranges to the highest mass-to-charge ratio within the desired ranges. Then, the at least one secondary ion detector may comprise a secondary ion detector arranged to detect ions having mass-to-charge ratios outside the overall range. The configuration of the secondary ion detector to any off-peak position may be possible.

A key use of the method described herein is for isotopic ratio measurement. Therefore, the processor is advantageously configured to determine a first mass intensity measurement, based on the main beam signal provided by a first primary ion detector and the at least one background signal (that is, a corrected measurement for a first mass position, isotope or isotopologue). Then, the processor may be configured to determine a second mass intensity measurement, based on the main beam signal provided by a second primary ion detector and the at least one background signal (that is, a corrected measurement for a second mass position, isotope or isotopologue). Hence, the processor may be configured to determine an isotope ratio based on the first and second mass intensity measurements.

Generally, it may be understood that, in one embodiment, the processor is configured to provide each of the at least one mass intensity measurement by determining a respective uncorrected mass intensity measurement on the basis of a main beam signal from the at least one main beam signal, for example a main beam signal from a first primary ion detector. Then, the processor may be further configured to determine a background mass intensity measurement on the basis the at least one background signal (from the at least one secondary ion detector). Advantageously, the processor may then be further configured to correct the uncorrected mass intensity measurement using the background mass intensity measurement. In particular, the processor may be configured to correct the uncorrected mass intensity measurement by subtracting the background mass intensity measurement, scaled by a factor, from the uncorrected mass intensity measurement. The factor may be one or another value. The factor is a preferably a constant, although it may be variable and dependent on one or more other parameters.

In general terms, a method of mass spectrometry or calibrating a mass spectrometer may be considered, comprising: spatially separating ions of a standard according to their mass-to-charge ratios using the mass-to-charge dispersive element; detecting, at each of at least one primary ion detector, spatially separated standard ions having mass-to-charge ratios within a respective desired range and providing a respective standard main beam signal based on the respective detected ions; detecting, at each of at least one secondary ion detector, ions having mass-to-charge ratios outside all of the desired ranges, simultaneously with the at least one primary ion detector detecting spatially separated standard ions and providing a respective standard background signal based on the respective detected ions; and determining a calibration factor based on a known property of the standard, the at least one standard main beam signal and the at least one standard background signal. For example, the calibration factor (which may be a constant or a variable) may be determined by comparing a function of a parameter derived from the at least one standard main beam signal and a parameter derived from the at least one standard background signal with the known property of the standard. The accuracy of the baseline calibration may be proven by a measurement of a standard at different intensities. After accurate baseline correction the measured isotope ratios can be consistent at different ion beam intensities. A mass spectrometer having features configured to operate in accordance with this method may also be provided. Advantageously, this method and/or mass spectrometer may be combined with the other method of mass spectrometry and/or mass spectrometer described herein. In such a combination, the step of providing at least one mass intensity measurement is further based on the calibration factor determined by the method and/or mass spectrometer now described.

The at least one secondary ion detector may have an amplifier with a high impedance, for example not lower (and optionally higher) than the highest impedance of any amplifier associated with the at least one primary ion detector. Optionally, the amplifier impedance is at least $10^{12}\Omega$ and more preferably, the amplifier impedance is at least $10^{13}\Omega$.

The mass-to-charge dispersive element may be configured to provide the dispersed ion beam together with scattered background ions. Then, the ion detection arrangement may further comprise a protection plate, positioned to shield the at least one primary ion detectors from at least a portion of the scattered background ions. The protection plate preferably extends across the focal plane of the mass-to-charge dispersive element (and/or extends in a direction approximately parallel to the direction of travel of the ion beam). It may have a coating, for example designed to have low secondary electron and secondary ion yields. The coating may comprise (or consist of) carbon (for example, graphite) or tantalum. The protection plate may be relatively small and/or thin in comparison with the size of the primary ion detector or detectors. For example, it may be thinner than the width of most or all of the primary ion detectors and/or thinner than the distance between two adjacent primary ion detectors.

In many embodiments, the at least one primary ion detector comprises a plurality of primary ion detectors. One or more of the plurality of primary ion detectors may be configured to detect a main part of the dispersed ion beam, the main part comprising a portion of the dispersed ion beam (separated according to mass-to-charge ratio) comprising at least 50%, 60%, 70%, 75%, 80%, 85%, 90%, 95%, 97.5% or 99% of the total ion abundance. Then, the one or more of the plurality of primary ion detectors configured to detect a main part of the dispersed ion beam may be configured to extend across a wider mass range than the remainder of the plurality of primary ion detectors. For example, where the primary ion detectors each comprise a Faraday cup and the one or more of the plurality of primary ion detectors may be wider than the remainder of the plurality of primary ion detectors.

Advantages of the features described herein may include the following. Standard collector configurations can be used. The scattered background on the minor isotope detectors may be significantly reduced, for example because of shielding plates installed in the collector array. Full flexibility of the detector array may be maintained. No energy filter may be needed. The integration of an energy filter may require space and good insulation. For instance, in case of high energy ion beams of 10 keV, the energy filter may need to be powered with voltages in the keV range. This may cause a problem in the detector array, where very sensitive current amplifiers are used to detect very small ion beams. Any high voltage spike could lead to damage or significant electronic interference on the high sensitivity measurement electronics. Real online background correction may be possible, as the background is measured at the same time as the isotopes or isotopologues of interest. The on-peak baseline measurement on an off-peak cup position may avoid the complication of unstable baseline measurements, because all ion beams are captured inside the (Faraday cup) detectors. The online baseline monitor cup at an off-peak position may reflect the true baseline measurement during the real measurement situation, where the major ion beams are captured inside detectors. The on-peak baseline measurement can be calibrated by the measurement of known standards. The recorded background signals can also be used as a quality control signal for the generation of metastable ions or for the detection of isobaric interferences, for example $K_6$ cluster ions in case of TIMS measurements interfering in the U mass range. The K contamination can be due to poor sample preparation or bad filament quality. Metastable ions can be generated in the ion source and show up as background peaks on various positions along the focal plane of the mass spectrometer. An unusual background signal could be an indicator for bad tuning of the ion source and thus could be used as a quality control signal as well.

Although a specific embodiment has been described, the skilled person will appreciate that various modifications and alternations are possible. For example, the mass spectrometer may be used for non-isotope ratio applications. In this case, the second main beam detector 42 may not be needed, for example. The number of main beam detectors and/or their position may be varied dependent upon the mass spectrometry application.

The skilled person will appreciate that more than one background level detector 43 may be provided. Then, the background level may be identified from multiple background signals, particularly in combination. The implementation herein is described with respect to a magnetic sector mass analyzer but another type of mass analyzer, using a mass-to-charge dispersive element (such as a magnetic and/or electric sector) may alternatively be employed.

Faraday collectors are preferred as ion detectors, but CDD and/or SEM detectors can alternatively be used.

It will therefore be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" (such as a mass-to-charge dispersive element) means "one or more" (for instance, one or more mass-to-charge dispersive elements). Throughout the description and claims of this disclosure, the words "comprise", "including", "having" and "contain" and variations of the words, for example "comprising" and "comprises" or similar, mean "including but not limited to", and are not intended to (and do not) exclude other components.

The use of any and all examples, or exemplary language ("for instance", "such as", "for example" and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The invention claimed is:

1. A mass spectrometer, comprising:
   a mass-to-charge dispersive element, configured to receive ions and separate the ions spatially according to their mass-to-charge ratios, to provide a dispersed ion beam thereby, wherein the mass to charge dispersive element comprises a magnetic sector mass analyzer;
   the ion detection arrangement for detecting ions in the dispersed ion beam, including at least one primary ion detector, each arranged to detect spatially separated ions having mass-to-charge ratios within a respective desired range and each configured to provide a respective main beam signal based on its respective detected ions, and at least one secondary ion detector, each arranged to detect ions having mass-to-charge ratios outside all of the desired ranges simultaneously with the at least one primary ion detector detecting the spatially separated ions and each of the at least one secondary ion detectors being configured to provide a respective background signal based on its respective detected ions; and,
   a processor, configured to provide at least one mass intensity measurement for the received ions having a mass-to-charge ratio within the desired range, based on the at least one main beam signal and the at least one background signal, wherein the background signal is subtracted from the main beam signal in order to correct the main beam signal.

2. The mass spectrometer of claim 1, wherein the at least one primary ion detector comprises a plurality of primary ion detectors, each arranged to detect spatially separated ions having mass-to-charge ratios within a respective desired range.

3. The mass spectrometer of claim 2, wherein the at least one primary ion detector further comprises: a first primary ion detector, arranged to detect spatially separated ions having mass-to-charge ratios within a first desired range; and a second primary ion detector, arranged to detect spatially separated ions having mass-to-charge ratios within a second desired range, the at least one secondary ion detector including a secondary ion detector arranged to detect ions having mass-to-charge ratios in an intermediate range, the intermediate range being between the first and second desired ranges.

4. The mass spectrometer of claim 2, wherein the plurality of desired ranges define an overall range extending continuously from the lowest mass-to-charge ratio within the desired ranges to the highest mass-to-charge ratio within the desired ranges and wherein the at least one secondary ion detector comprises a secondary ion detector arranged to detect ions having mass-to-charge ratios outside the overall range.

5. The mass spectrometer of claim 2, wherein each of the desired ranges corresponds with a range of mass-to-charge ratios for an isotope of an element or an isotopologue of a molecule and wherein the at least one secondary ion detector includes a secondary ion detector arranged to detect spatially separated ions having mass-to-charge ratios that do not correspond with a range of mass-to-charge ratios for an isotope of the element or an isotopologue of the molecule.

6. The mass spectrometer of claim 5, wherein the element comprises uranium, helium or thorium or wherein the molecule comprises carbon dioxide.

7. The mass spectrometer of claim 5, wherein the processor is configured to determine a first mass intensity measurement, based on the main beam signal provided by a first primary ion detector and the at least one background signal and to determine a second mass intensity measurement, based on the main beam signal provided by a second primary ion detector and the at least one background signal and to determine an isotope ratio based on the first and second mass intensity measurements.

8. The mass spectrometer of claim 2, wherein the plurality of primary ion detectors are configured to measure ion intensities having a dynamic range of at least 1:100.

9. The mass spectrometer of claim 1, wherein the processor is configured to provide each of the at least one mass intensity measurement by: determining a respective uncorrected mass intensity measurement on the basis of a main beam signal from the at least one main beam signal; determining a background mass intensity measurement on the basis the at least one background signal; and correcting the uncorrected mass intensity measurement using the background mass intensity measurement.

10. The mass spectrometer of claim 9, wherein the processor is configured to correct the uncorrected mass intensity measurement by subtracting the background mass intensity measurement, scaled by a factor, from the uncorrected mass intensity measurement.

11. The mass spectrometer of claim 10, wherein the factor is a constant.

12. The mass spectrometer of claim 1, wherein the mass-to-charge dispersive element is configured to provide the dispersed ion beam together with scattered background ions, the ion detection arrangement further comprising:
   a protection plate, positioned to shield the at least one primary ion detector from at least a portion of the scattered background ions.

13. The mass spectrometer of claim 1, configured such that ions spatially separated by the mass-to-charge dispersive element are received at each of the at least one primary ion detector without energy filtering in between.

14. The mass spectrometer of claim 1, wherein each of the at least one primary ion detector and/or each of the at least one secondary ion detector comprises one or more of: a Faraday cup; an ion counting channel; a secondary electron multiplier; a photomultiplier; a compact discrete dynode detector.

15. The mass spectrometer of claim 14, wherein the at least one primary ion detector comprises a plurality of primary ion detectors, each primary ion detector including a Faraday cup and wherein one or more of the plurality of primary ion detectors is configured to detect a main part of the dispersed ion beam, said one or more of the plurality of primary ion detectors being wider than a remainder of the plurality of primary ion detectors.

16. The mass spectrometer of claim 1, further comprising:
   an ion source, configured to generate ions; and
   ion optics, configured to provide the generated ions to the mass-to-charge dispersive element.

17. A method of mass spectrometry, comprising:
   spatially separating received ions according to their mass-to-charge ratios using a mass-to-charge dispersive element, to provide a dispersed ion beam thereby, wherein the mass to charge dispersive element comprises a magnetic sector mass analyzer;
   detecting, at each of at least one primary ion detector, spatially separated ions having mass-to-charge ratios within a respective desired range and providing a respective main beam signal based on the respective detected ions;
   detecting, at each of at least one secondary ion detector, ions having mass-to-charge ratios outside all of the desired ranges, simultaneously with the at least one primary ion detector, and providing at each of at least one secondary ion detector a respective background signal based on the respective detected ions; and, providing at least one mass intensity measurement for the received ions having a mass-to-charge ratio within the desired range, based on the at least one main beam signal and the at least one background signal, wherein the background signal is subtracted from the main beam signal in order to correct the main beam signal.

18. The method of claim 17, wherein the at least one primary ion detector detects a high ion intensity relative to the ion intensity detected by the at least one secondary ion detector.

19. The method of claim 17, further comprising:

configuring the mass-to-charge dispersive element and/or the at least one primary ion detector, so as to cause the at least one primary ion detector to detect one or more ion intensity peaks in the dispersed ion beam; and configuring the at least one secondary ion detector, such that each of the at least one secondary ion detector detects a background ion intensity.

20. The method of claim 17, further comprising:

spatially separating ions of a standard according to their mass-to-charge ratios using the mass-to-charge dispersive element;

detecting, at each of the at least one primary ion detector, spatially separated standard ions having mass-to-charge ratios within a respective desired range and providing a respective standard main beam signal based on the respective detected ions;

detecting, at each of at least one secondary ion detector, ions having mass-to-charge ratios outside all of the desired ranges, simultaneously with the at least one primary ion detector detecting spatially separated standard ions, and providing at each of at least one secondary ion detector a respective standard background signal based on the respective detected ions; and determining a calibration factor based on a known property of the standard, the at least one standard main beam signal and the at least one standard background signal; and wherein the step of providing at least one mass intensity measurement is further based on the determined calibration factor.

* * * * *